United States Patent
Mack

(10) Patent No.: US 12,264,657 B1
(45) Date of Patent: Apr. 1, 2025

(54) CENTRIFUGAL FORCE PROPULSION DEVICE

(71) Applicant: John L. Mack, Upper Marlboro, MD (US)

(72) Inventor: John L. Mack, Upper Marlboro, MD (US)

( * ) Notice: Subject to any disclaimer, the term of this patent is extended or adjusted under 35 U.S.C. 154(b) by 0 days.

(21) Appl. No.: 18/543,739

(22) Filed: Dec. 18, 2023

(51) Int. Cl.
  *F03H 99/00* (2009.01)
  *B64G 1/40* (2006.01)
  *F16H 7/02* (2006.01)

(52) U.S. Cl.
  CPC ............. *F03H 99/00* (2013.01); *B64G 1/409* (2013.01); *B64G 1/417* (2023.08); *F16H 7/02* (2013.01)

(58) Field of Classification Search
  CPC ......... F03H 99/00; B64G 1/409; B64G 1/411; B64G 1/417
  See application file for complete search history.

(56) References Cited

U.S. PATENT DOCUMENTS

2004/0219007 A1   11/2004   Tavarez
2007/0295164 A1*  12/2007   Tavarez .................. F03H 99/00
                                          74/84 S

FOREIGN PATENT DOCUMENTS

WO   0155592   2/2001

OTHER PUBLICATIONS https://militaryembedded.com/comms/satellites/centrifugal-impulse-drive-introduced-as-new-form-of-propulsion-for-space-flight#:~:text=The%20Centrifugal%20Impulse%20Drive%20(CID)%20utilizes%20a,directly%20into%20thrust%20to%20propel%20the%20spacecraft.
https://www.youtube.com/watch?app=desktop&v=vyW7IGLzSnU.
https://www.youtube.com/watch?v=iqY1plld4o0.

* cited by examiner

*Primary Examiner* — Kyle Robert Thomas

(57) ABSTRACT

A centrifugal force propulsion device is disclosed. The device includes an asymmetrical device enclosure, having a first end wider than a second end. The device includes a magnetically charged mass and a rotating electromagnetic field source encircling the asymmetrical device enclosure, where the asymmetrical device enclosure is accelerated to a high revolutions-per-minute, resulting in a force vector in a direction of the first end of the robotic arm assemblies, and interchangeable robotic arm assembly attachment tools attachable to the attachment end for each of the robotic arm assemblies. The device may include a belt-driven centrifugal force propulsion system including a first pulley coupled to a second pulley by a weighted belt, where the first pulley has a first pulley size greater than a second pulley size and a power source coupled to either of the pulleys to generate a net force vector in the direction of the first pulley.

6 Claims, 2 Drawing Sheets

CENTRIFUGAL FORCE PROPULSION DEVICE

BACKGROUND

Technical Field

This disclosure relates to propulsion systems. In particular, the disclosure relates to, and without limitation, a propulsion device propelled by centrifugal forces via electromagnetic interactions applied directly or via an electric motor.

Hydrodynamic and centrifugal propulsion systems are known in the art.

US 2004/0219007 describes a hydrodynamic propellantless propulsion.

WO 01/55592 describes a centrifugal propulsion system.

While propellant-less propulsion systems are known in the art, these systems are limited in their applicability for efficient usage.

Therefore, a need exists for a propulsion device that provides minimum momentum loss due to inefficiencies in design.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

A centrifugal force propulsion device is disclosed. The device includes an asymmetrical device enclosure, having a first end wider than a second end. The device includes a magnetically charged mass and a rotating electromagnetic field source encircling the asymmetrical device enclosure, where the asymmetrical device enclosure is accelerated to a high revolutions-per-minute, resulting in a force vector in a direction of the first end the robotic arm assemblies, and interchangeable robotic arm assembly attachment tools attachable to the attachment end for each of the robotic arm assemblies.

In another aspect, a belt-driven centrifugal force propulsion system is disclosed. The belt-driven centrifugal force propulsion system may include a first pulley coupled to a second pulley by a weighted belt, where the first pulley has a first pulley size greater than a second pulley size; and a power source coupled to either of the first pulley or the second pulley, where the power source rotates either the first pulley or the second pulley, where a rotation of the weighted belt around the first pulley and around the second pulley generates a net motive vector force in the lateral direction of the first pulley relative to the second pulley.

Other systems, methods, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
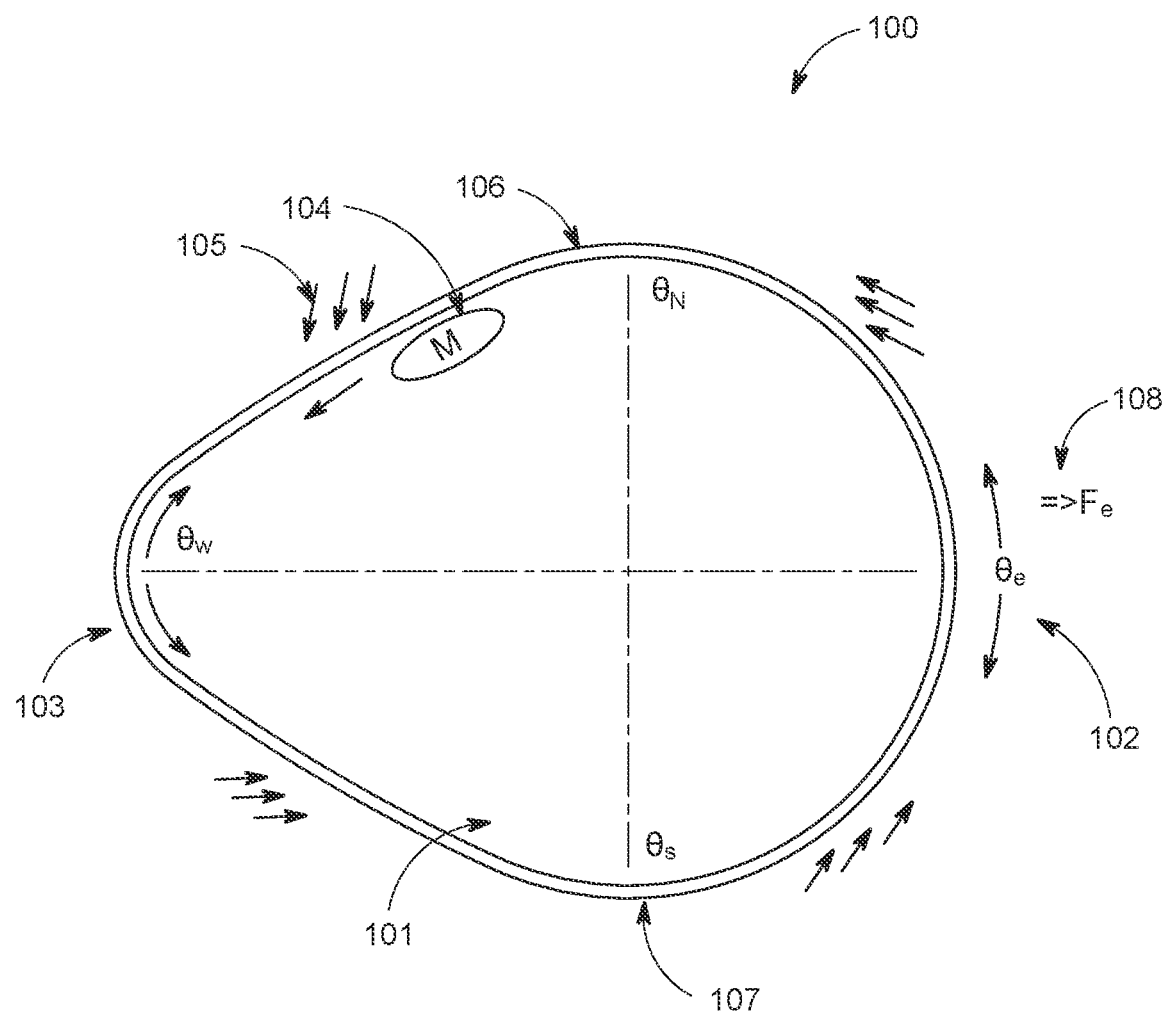
FIG. 1 is a view of a first aspect of a centrifugal force propulsion device, according to the disclosure.

Various aspects of the present disclosure will be described in detail with reference to the drawings, wherein like reference numerals represent like parts and assemblies throughout the several views. Reference to various aspects does not limit the scope of the disclosure, which is limited only by the scope of the claims attached hereto. Additionally, any examples set forth in this specification are not intended to be limiting and merely set forth some of the many possible aspects for the claimed disclosure.

In describing aspects of the present disclosure, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "communicate," or "communication" refer to any component(s) connecting with any other component(s) in any combination, whether through direct physical connection, intermediary physical connection or wirelessly connected for the purpose of the connected components to communicate, interact, transfer energy or motion and/or transfer data to and from any components and/or control any settings.

As is well known, bodies which are in other motion than a uniform linear motion, in other words, bodies whose velocity or direction of motion is varied, have an inertial force generated due to acceleration. The bodies following a curvilinear track go through a change of direction and velocity of motion thereof due to a force imparted from a supporting unit guiding the curvilinear motion, such that an equivalent force is inversely applied to the supporting unit as a reaction force.

In general, a centrifugal force is a force deconcentrately exerted from a center of curvature in a body following a curvilinear track. The centrifugal force is simply proportional to a mass or a radius of curvature of the rotational body and proportional to a square of an angular velocity of the rotational body. Accordingly, if the angular velocity of the body is beyond a predetermined level, the centrifugal force is appreciably increased. For example, a centrifugal force, which is encountered to a body}' weighing at M kg and rotating at 600 rpm along a circular orbit of 10 cm. is calculated as follows:

$$CF=Mrco2=M(kg) \times 0.1(m) \times (20)2(rad/sec)2=394.8M (kg)(m)/sec2).$$

As shown in the result, the centrifugal force amounts to about 40 times a gravity (9.8M (kg)(m)/(sec2)) applied to the body weighing at M kg.

As above, since the centrifugal force permits attainment of a greater force, the centrifugal force is widely used for producing a force in drying machines and centrifugal separators as well as for producing an artificial gravity in space stations. General vehicles or submarines may attain a driving force by virtue of an action-reaction force between each wheel and a ground, or between a propeller and a water, and general airplanes may attain a floating force by virtue of an action-reaction force between a wing and an air. However, the centrifugal force has an advantage of producing a motion in a supporting unit without any reaction force generated through an external medium by directly acting on the supporting unit supporting a rotational body. Thus, there have been continuous attempts to attain a driving force for moving a body by using the centrifugal force.

Almost all forms of propulsion result in some polluting exhaust being expelled. Electric vehicles don't create exhaust fumes but use electric motors to drive wheels (cars) or propellers (ships/boats/aircraft) which would be of limited or no use in space or extraterrestrial environments.

For magnetic materials and electrically charged materials, such as ferro-liquids, the working principle for magnetohydrodynamic propulsion involves the acceleration of an electrically conductive fluid (which can be a liquid, solid, or an ionized gas called a plasma) by the Lorentz force, resulting from the cross product of an electric current (motion of charge carriers accelerated by an electric field applied between two electrodes) with a perpendicular magnetic field. The Lorentz force accelerates all charged particles, positive and negative species (in opposite directions). If either positive or negative species dominate, the vehicle is put in motion in the opposite direction from the net charge.

FIG. 1 is a view of a first aspect of a centrifugal force propulsion device 100, according to the disclosure. Using an asymmetrical device enclosure 101, such as a teardrop-shaped device enclosure, with a first end 102 wider than a second end 103 a magnetically charged mass 104 (solid, liquid or gas) is accelerated to a high RPM using a rotating electromagnetic field source 105 encircling the enclosure. In an aspect, rotating electromagnetic field source 105 may be a magnetohydrodynamic generator. the FIG. 1 illustrates a first lateral edge 106 and a second lateral edge 107. This causes a resultant force vector 108 in the direction of the first (wider) end 102.

In an aspect according to the disclosure, a first lateral force on the first lateral edge 105 equals a second lateral force on the second lateral edge 106, therefore causing a net force of zero in the lateral directions indicated by the first lateral edge 105 and the second lateral edge 106. A Lorentz force acting on the magnetically charged mass 103 within the teardrop-shaped device enclosure 100 is directed towards the first end 101 by vector addition of the forces acting on the magnetically charged mass 103 within the teardrop-shaped device enclosure 100.

The disclosed propulsion method/solution using the centrifugal force propulsion device 100 may solve the following problems:

1) Dependent on the source of power to the rotating electromagnetic field, so no exhaust is emitted;
2) No outside atmosphere is required thus making this ideal for space exploration including exploring space objects, e.g. planets, asteroids, etc.;
3) In space exploration, an extra-atmospheric vehicle can provide a constant propulsive force propelling a capsule, or other vehicle, to extremely high velocities (since no friction, due to no atmosphere) thus significantly shortening the time to travel to a destination in space;
4) Speed and direction can be controlled having a computer-controlled array of devices with force vectors controlling the 3-degrees of freedom (up/down, forward/backward, left/right) of the containing capsule. A computer could manipulate the device(s), which could be mounted in numbers (for larger force generation), on a rotating axis/rod, such that one or more electromagnetic field generators can be configured to alter the direction of travel of the centrifugal force propulsion device by directionally altering a magnitude and a direction of the rotating electromagnetic field;
5) Under computer control, the capsule/vehicle, could be moved in any direction without the need for external planes, fins, flaps, etc.;
6) Thus it could provide us with a flying car, or simply a land-bound car but without exhaust fumes; and
7) Likewise, it could be used on/under water to propel a vehicle very quietly causing significantly less disturbance to aquatic animals. In a submarine, it would make it much harder to locate it—thus potential military uses or underwater exploration uses.

The optimum efficiency of the centrifugal force propulsion device 100 will depend on the type of material used for the magnetic, rotating mass. In an aspect, ferromagnetic fluids would provide the least problems.

Figure 2:
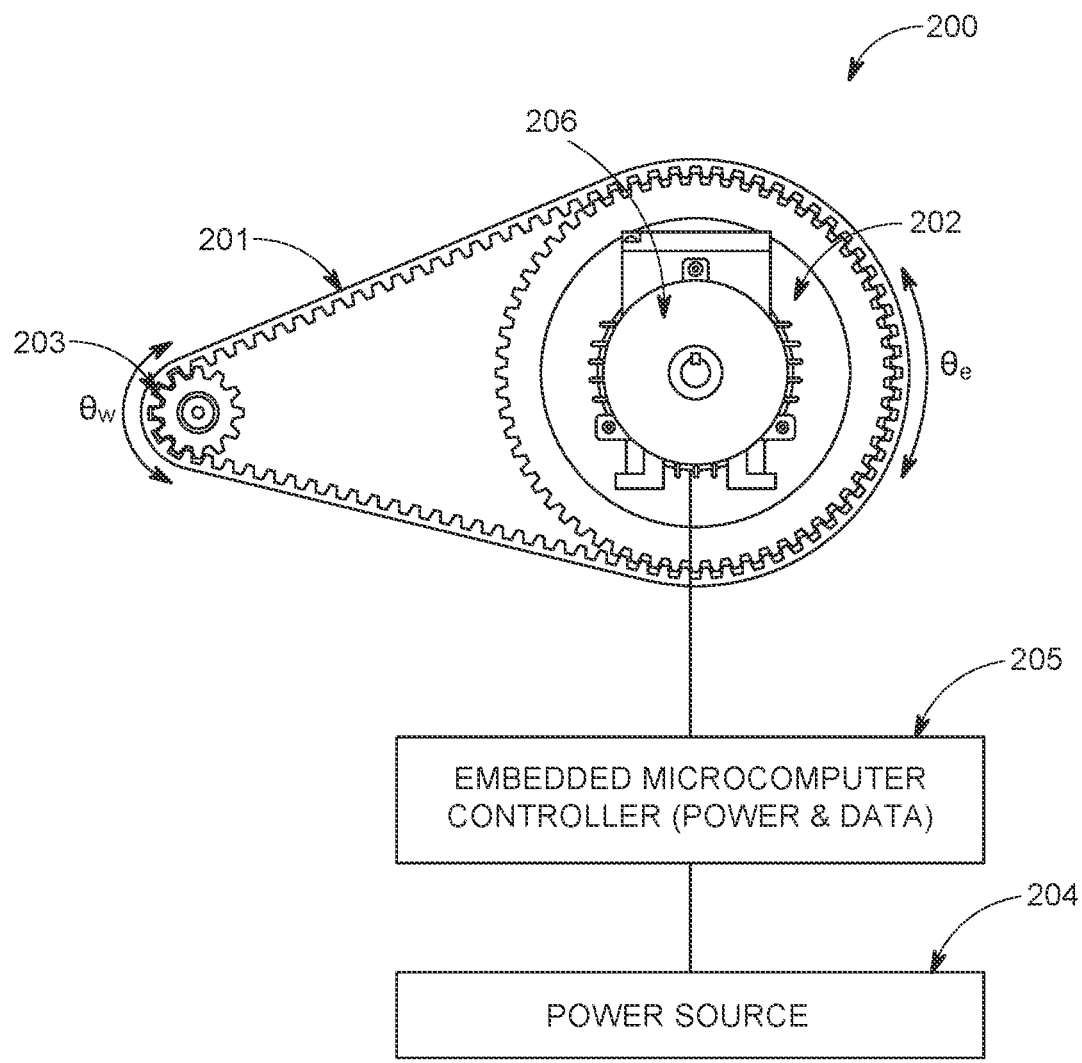
FIG. 2 illustrate a weighted belt-on-a-pulley system, an alternative aspect of the disclosure.

FIG. 2 illustrates a weighted belt-on-a-pulley system 200, an alternative aspect of the disclosure. In an aspect, the weighted belt-on-a-pulley system 200 could serve as a belt-driven centrifugal force propulsion system. In this aspect, a weighted belt 201 of mass 'M' would be rotated around a first pulley 202 and a second pulley 203, where the first pulley 202 has a different size from the second pulley 203. With this configuration, the weighted belt-on-a-pulley system 200 mimics the "teardrop" (asymmetrical device enclosure 101) configuration of FIG. 1.

In an aspect, the first pulley 202 being "X" times larger than the second pulley. Because the weighted belt 201 of mass 'M' spends more time traversing around the first pulley 202 the result is a net motive force vector in the lateral direction of the first pulley 202 relative to the location of the second pulley 203.

The size of the resultant force vector is dependent on the mass of the weighted belt 201 and the rotational speed (RPMs) of the weighted belt 202. As such, the net force can be scaled up or down to match the need of an application. The propulsive engine created by this approach would have as many belts as necessary (of possible varying widths to cut down on the number of belts) which would be driven by an electric motor 204 using any standard source of electricity (battery, nuclear, internal combustion engine, etc.). The weighted belt-on-a-pulley system 200 would be arranged mechanically such that they control (point in) the 3 degrees of freedom of the vehicle and be controlled by a microcontroller 205, such as an embedded microcontroller to determine direction (up/down, right/left, forward/reverse) and speed (RPM of the belt(s)). The speed and direction could be controlled by an input control device 206 in communication with the microcontroller 205 to communicate the direction of the net motive vector force or a speed of rotation of the weighted belt 201 around the first pulley 202 and the second pulley 202 to the microcontroller 205. In an aspect, the input control device 206 may include a joystick type device, steering/velocity device, touchscreen, touchpad, control wand or other input control device which would send the signals to the microcomputer 205 to control the weighted belt-on-a-pulley system 200.

The weighted belt-on-a-pulley system 200 could serve as the power source for the applications discussed above in relation to the centrifugal force propulsion device 100, as one of skill in the art would appreciate the uses for a propulsion source such as the weighted belt-on-a-pulley system 200.

While various aspects of the disclosure have been described, it will be apparent to those of ordinary skill in the art that many more aspects and implementations are possible within the scope of the disclosure. Accordingly, the disclosure is not to be restricted except in light of the attached claims and their equivalents.

What is claimed is:

1. A centrifugal force propulsion device comprising:
   an asymmetrical device enclosure, comprising a first end wider than a second end;
   a magnetically charged mass; and
   a rotating electromagnetic field source encircling the asymmetrical device enclosure, where the asymmetrical device enclosure is configured to be accelerated such that the asymmetrical device enclosure revolves, resulting in a force vector in a direction of the first end.

2. The centrifugal force propulsion device of claim 1, where the asymmetrical device enclosure comprises a teardrop shaped enclosure.

3. The centrifugal force propulsion device of claim 2, where the magnetically charged mass comprises a ferromagnetic liquid.

4. The centrifugal force propulsion device of claim 1, where the magnetically charged mass comprises a ferromagnetic liquid.

5. The centrifugal force propulsion device of claim 1, further comprising one or more electromagnetic field generators configured to alter the direction of travel of the centrifugal force propulsion device by directionally altering a magnitude and a direction of the rotating electromagnetic field.

6. An exo-atmospheric vehicle comprising:
   an asymmetrical device enclosure, comprising a first end wider than a second end;
   a magnetically charged mass; and
   a magnetohydrodynamic generator in electromagnetic communication with the asymmetrical device enclosure and configured to result in a force vector acting on the asymmetrical device enclosure in a direction of the first end.

* * * * *